(12) United States Patent
Nagasaka et al.

(10) Patent No.: US 8,733,471 B2
(45) Date of Patent: May 27, 2014

(54) RECHARGEABLE ELECTRIC TOOL

(75) Inventors: Hidenori Nagasaka, Anjo (JP);
Ryunosuke Kumagai, Anjo (JP)

(73) Assignee: Makita Corporation, Anjo (JP)

( * ) Notice: Subject to any disclaimer, the term of this patent is extended or adjusted under 35 U.S.C. 154(b) by 367 days.

(21) Appl. No.: 13/220,987

(22) Filed: Aug. 30, 2011

(65) Prior Publication Data
US 2012/0061117 A1 Mar. 15, 2012

(30) Foreign Application Priority Data

Sep. 13, 2010 (JP) ................................. 2010-204677
Jan. 13, 2011 (JP) ................................. 2011-005215

(51) Int. Cl.
*B25F 5/02* (2006.01)
*H01M 2/10* (2006.01)

(52) U.S. Cl.
CPC . *B25F 5/02* (2013.01); *Y02E 60/12* (2013.01); *H01M 2220/30* (2013.01); *H01M 2/1022* (2013.01); *H01M 2/1094* (2013.01)
USPC ............................................ 173/217; 429/97

(58) Field of Classification Search
USPC ......... 173/217, 128, 20, 91, 46; 220/3.8, 314, 220/315; 366/108, 120; 429/97, 123
See application file for complete search history.

(56) References Cited

U.S. PATENT DOCUMENTS 4,160,857 A * 7/1979 Nardella et al. ................. 429/97
4,375,323 A * 3/1983 Inagaki et al. ................. 396/29

FOREIGN PATENT DOCUMENTS

JP         A-9-158483         6/1997

* cited by examiner

*Primary Examiner* — Thanh Truong
*Assistant Examiner* — Joy N Sanders
(74) *Attorney, Agent, or Firm* — Oliff PLC

(57) ABSTRACT

The present invention provides a rechargeable electric tool in which a battery pack as a power supply slides in a battery holder formed in an end part of a housing. A bag-shaped waterproof cover covering the battery pack including a coupling part between the battery holder and the battery pack is formed by two divided covers which are separated to the front and rear sides in a slide attachment direction of the battery pack. Between the two divided covers, a coupling mechanism can be moved to a coupling position or a coupling cancelling position. The coupling position is a position in which the divided covers are coupled to each other in an attached state where the coupling part and the battery pack are covered. The coupling cancelling position is a position in which coupling of the divided covers is cancelled.

13 Claims, 11 Drawing Sheets

RECHARGEABLE ELECTRIC TOOL

BACKGROUND OF THE INVENTION

This application claims the entire benefit of Japanese Patent Application Number 2010-204677 filed on Sep. 13, 2010 and Japanese Patent Application Number 2011-005215 filed on Jan. 13, 2011, the entirety of which is incorporated by reference.

TECHNICAL FIELD

The present invention relates to a rechargeable electric tool having a battery pack as a power supply slides in a battery holder formed in an end part of a housing.

BACKGROUND ART

Japanese Patent Application Laid-Open Publication No. H09-158483 discloses an invention of a battery cover which prevents infiltration of rainwater from a gap between a battery pack and a housing so that an adverse influence of rainwater is not exerted on an electric product housed in a rechargeable electric tool.

The battery cover of Japanese Patent Application Laid-Open Publication No. H09-158483 is attached to the outside of a battery inserted in a lower part of a handle housing and is supported by the handle housing so as to be turnable around the pivot point. Further, a seal member made of rubber is provided at the upper periphery of the battery cover. In the case where the battery cover covers the battery pack, the sealing performance between the battery cover and the handle housing is increased by the seal member.

However, the battery cover is attached to the outside of the battery pack by retaining a nail of the battery cover with the flange of the handle housing. Consequently, the battery cover is not tightly attached to the handle housing, which leads low performance of the sealing between the handle housing and the battery cover.

Further, in the rechargeable electric tool, to prevent a problem in the turning operation of the battery cover, space has to be assured between the inner face of the battery cover and the battery pack. It is therefore concerned that the battery cover becomes larger, and the size of the rechargeable electric tool becomes also larger.

In consideration of such a problem, an object of the present invention is to propose and provide a compact rechargeable electric tool having excellent waterproof performance in a battery pack.

SUMMARY OF THE INVENTION

A first aspect of the present invention is a rechargeable electric tool including a battery holder provided at an end of a housing, a battery pack which is slid and attached to the battery holder and serves as a power supply, and a waterproof cover in a container shape having four sides, a bottom and a top enclosing a volume matching an external shape of the battery pack, wherein the top is substantially open to accommodate the housing, which covers the battery pack including a coupling part between the battery holder and the battery pack. The waterproof cover is formed by two divided covers which are separated to the front and rear sides in a slide attachment direction of the battery pack. A coupling mechanism is provided between the two divided covers, and when the two covers are coupled to each other (coupling position), the battery cover is covered. The coupling cancelling position is a position in which coupling of the divided covers is cancelled.

In a second aspect of the present invention according to the first aspect, the rechargeable electric tool as an embodiment of the invention includes a sealer which seals coupling faces of the two divided covers in the attached state is provided between the two divided covers.

In a third aspect of the present invention according to the second aspect, the rechargeable electric tool as an embodiment of the invention, the sealer is a first seal member provided integrally with a coupling face of at least one of the divided covers, which is to be coupled to the other divided cover, and the first seal member is interposed between the coupling faces in the attached state.

In a fourth aspect of the present invention according to the first aspect, the rechargeable electric tool as an embodiment of the invention, a seal face is formed in the battery holder and seals a gap between the housing and the waterproof cover, with which an entire periphery of an opening of the waterproof cover comes into contact in the attached state.

In a fifth aspect of the present invention according to the fourth aspect, the rechargeable electric tool as an embodiment of the invention, an annular second seal member is interposed between the waterproof cover and the seal face in the attached state.

In a sixth aspect of the present invention according to the first aspect, the rechargeable electric tool as an embodiment of the invention, the battery holder has a screw hole for attaching a hook for hanging, and the divided cover has a through hole. When the divided cover is slid in the slide attachment direction to a position where the though hole is overlapped with the corresponding screw hole, the screw hole can be fitted with the through hole by screwing.

According to the first aspect of the present invention, the rechargeable electric tool as an embodiment of the invention can prevent rainwater and the like from entering the battery through the coupling part between the battery holder and the battery pack toward the battery. Further, rainwater entering the battery from the outer face of the battery pack can be prevented. Consequently, waterproof performance to the battery pack is improved.

Further, since the two divided covers coupled to each other are slidable in different directions, it is unnecessary to provide a space for a turning operation of the waterproof cover. Therefore, even when the waterproof cover of the two divided covers is provided, the rechargeable electric tool can be made compact.

According to the second aspect of the present invention, in the rechargeable electric tool as an embodiment of the invention, the two divided covers are sealed by the coupling faces thereof in the attached state where the coupling part and the battery pack are covered with the waterproof cover. Therefore, rainwater and the like is prevented from entering the inside of the waterproof cover through the gap between the coupling faces.

According to the third aspect of the present invention, in the rechargeable electric tool as an embodiment of the invention, in the attached state, the first seal member provided integrally with at least one of the divided covers seals the gap between the coupling faces. Therefore, rainwater and the like is prevented from entering the inside of the waterproof cover through the gap between the coupling faces.

According to the fourth aspect of the present invention, the rechargeable electric tool as an embodiment of the invention, in the attached state of the two divided covers, the gap between the opening of the waterproof cover and the battery holder can be closely sealed by the seal face of the battery holder. Therefore, rainwater and the like can be prevented from entering the inside of the waterproof cover through the gap between the coupling faces.

According to the fifth aspect of the present invention, in the rechargeable electric tool as an embodiment of the invention, in the attached state, the second seal member seals the gap between the waterproof cover and the seal face. Therefore, rainwater and the like is prevented from entering the inside of the waterproof cover through the gap between the coupling faces.

According to the sixth aspect of the present invention, in the rechargeable electric tool as an embodiment of the invention, by screwing a screw into the screw hole through the through hole, while one of the divided covers forming the waterproof cover is fixed to the battery holder, the other divided cover can be separated from the divided cover. Therefore, without detaching the one of the divided covers from the battery holder, the battery pack can be slid in/out from the battery holder from the side of the other divided cover which is separated from one of the divided covers.

DETAILED DESCRIPTION OF THE EMBODIMENTS

First Embodiment

Figure 1:
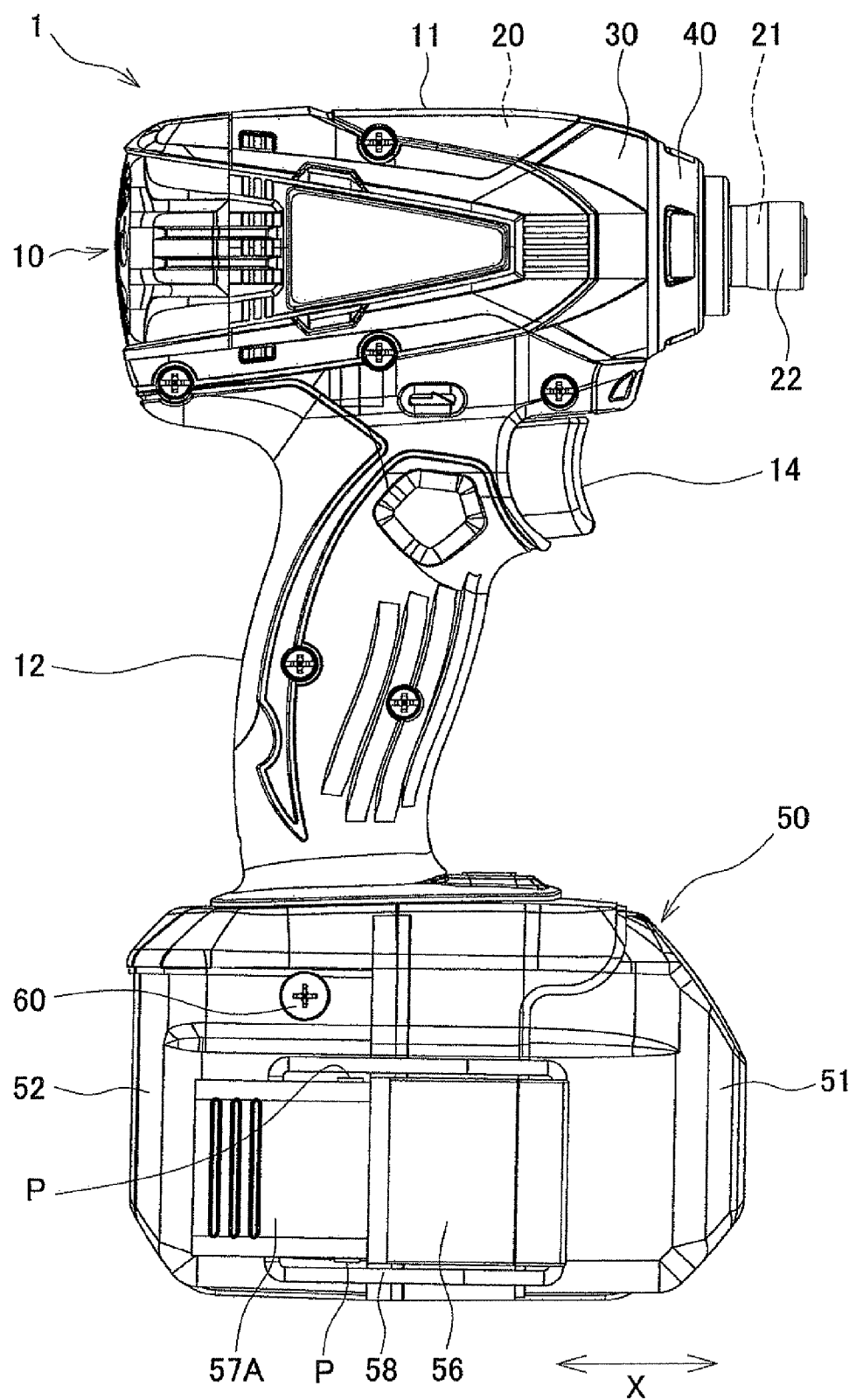
FIG. 1 is a side view of an impact driver to which a waterproof cover in a first embodiment of the present invention is attached.

A first embodiment of the present invention will be described with reference to FIGS. 1 to 5. As illustrated in FIG. 1, an impact driver 1 has a body housing 10, a hammer case 20, a cover 30, a bumper 40, and a waterproof cover 50.

Figure 2:
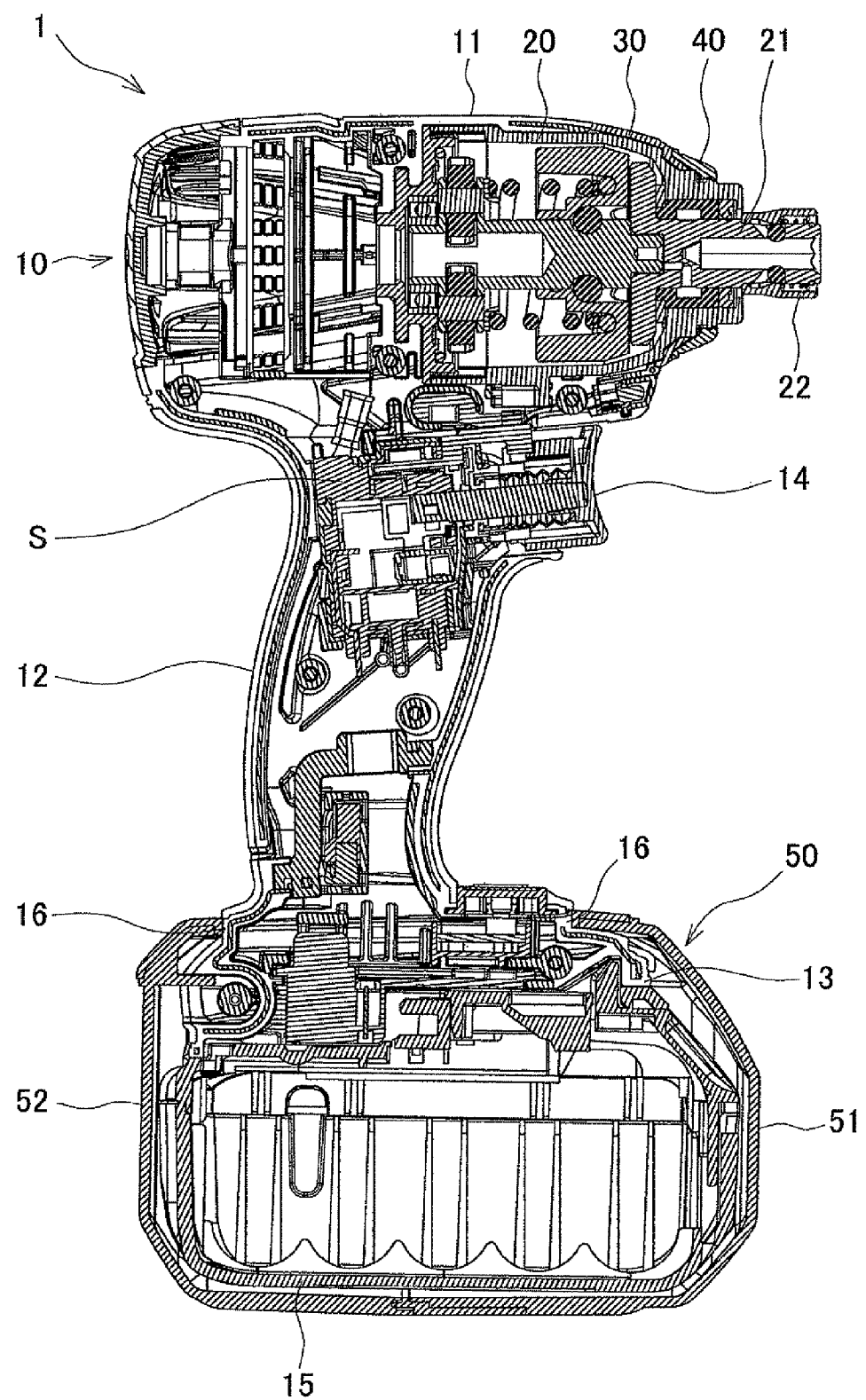
FIG. 2 is a cross section of a main part of the impact driver in the first embodiment.

The body housing 10 is formed by assembling right and left halved housings made of resin and has a body 11, a handle 12, and a battery holder 13. The body 11 has a tubular shape and extends in the longitudinal direction (the right side in FIGS. 1 and 2 is the front side, and the left side in FIGS. 1 and 2 is the rear side). In the body 11, a motor is housed.

Figure 3:
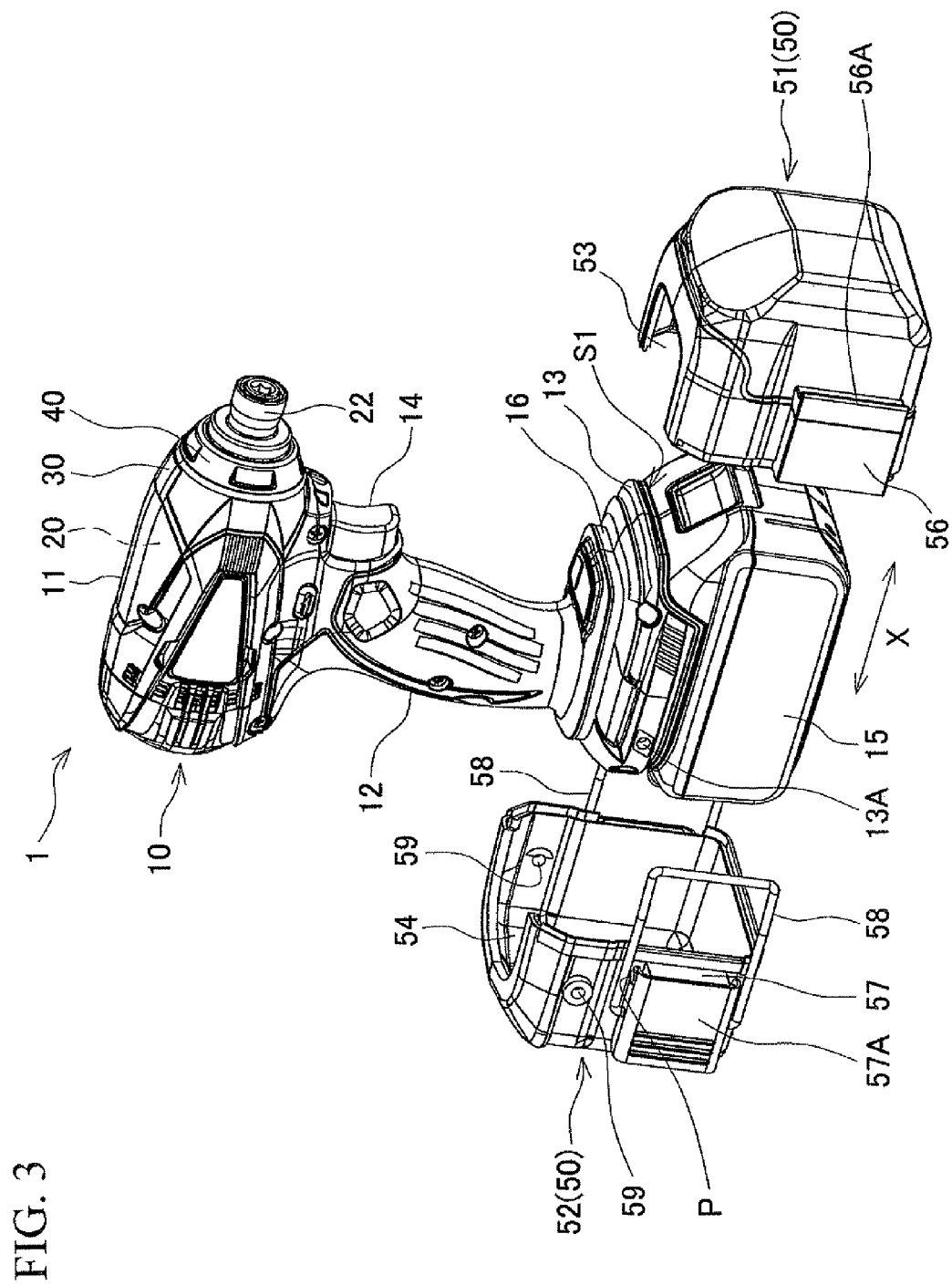
FIG. 3 is an exploded perspective view of the waterproof cover before the cover is attached to the impact driver in the first embodiment.
Figure 4:
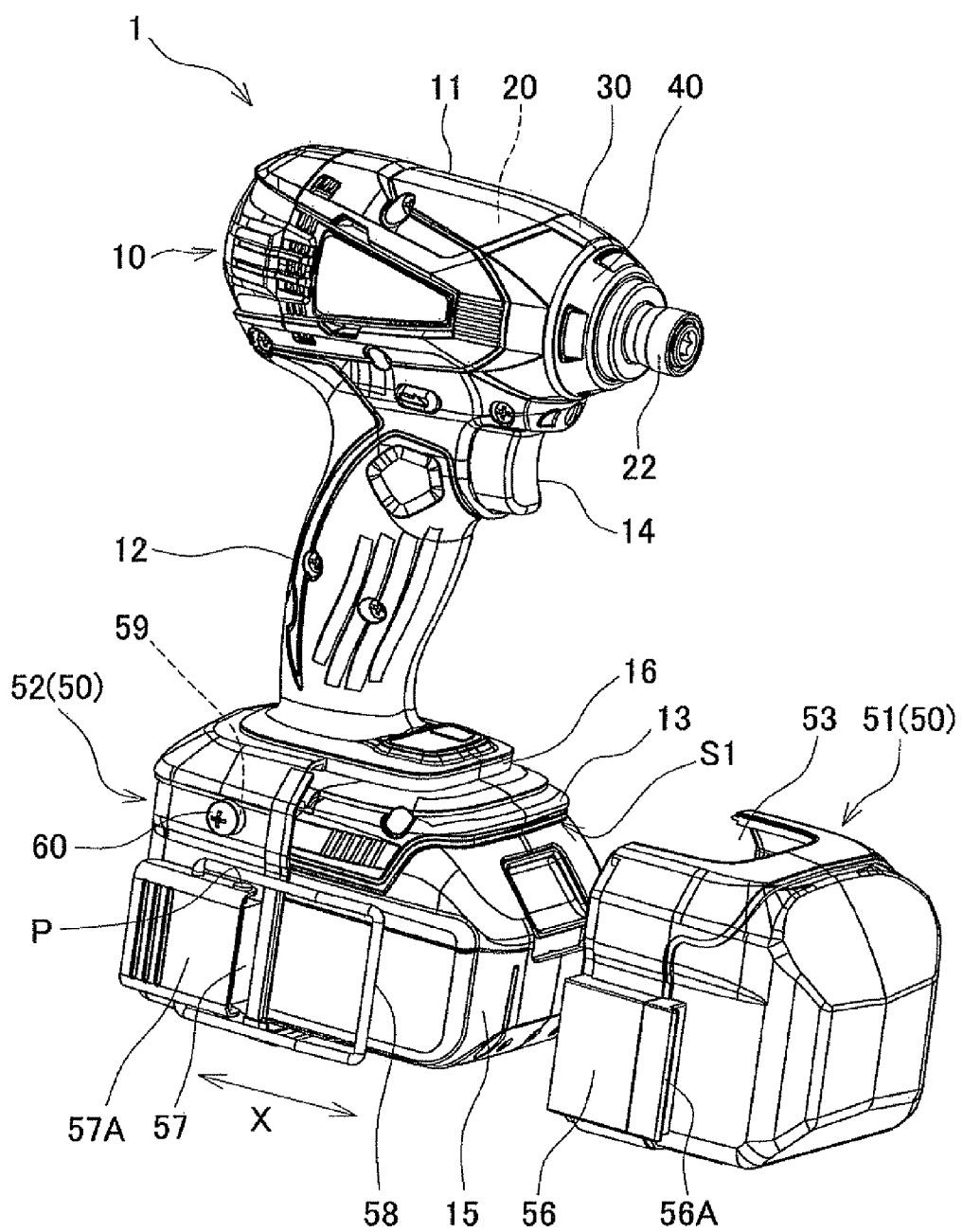
FIG. 4 is a diagram showing a state where a rear-side cover is screwed to a battery holder in the impact driver in the first embodiment.

As illustrated in FIGS. 1 and 2, the handle 12 extends from the body 11 in an almost T shape in side view of the impact driver 1, and a switch S having a trigger 14 which is provided on the handle 12. As illustrated in FIGS. 2 to 4, the battery holder 13 is provided below the handle 12, and a battery pack 15 is detachably inserted in the battery holder 13. The battery pack 15 is inserted in the battery holder 13 by being slid along a slide rail provided on the side of the battery holder 13. The battery pack 15 is a rechargeable power supply and supplies power to the motor. The impact driver 1 is an example of a rechargeable electric tool of the present invention, and the body housing 10 is an example of a housing of the invention.

As illustrated in FIGS. 3 and 4, a seal face 16 is formed in the battery holder 13. In the embodiment, the seal face 16 protrudes from the outer surface of the battery holder 13, and has a step in the entire periphery of the battery holder 13. As will be described later, an opening of the waterproof cover 50 and the handle 12 is sealed by the seal face 16.

As shown in FIG. 3, a screw hole 13A is formed in each of right and left side faces in front view of the battery holder 13. Screws are screwed in the screw holes 13A to fix a hook (not shown) for hanging the impact driver 1 from a belt of an operator.

The hammer case 20 is made of metal (for example, aluminum) and is assembled in a front part of the body 11 (the right side in FIGS. 1 and 2). The hammer case 20 has therein a hammering mechanism and an anvil 21 (refer to FIGS. 1 and 2), and the anvil 21 projects from the front end face of the hammer case 20. The anvil 21 is rotatably supported in the hammer case 20 by a bearing. A chuck 22 to which a front-end tool can be attached is provided at the tip of the anvil 21. The hammering mechanism converts the rotation of the motor to a rotation hammering force and transmits the force to the front-end tool.

The cover 30 is made of a synthetic resin, formed in a tubular shape, and attached to the periphery of a front part of the hammer case 20. The bumper 40 is made of a synthetic rubber, formed in a ring shape, assembled at the front end of the cover 30, and attached to the periphery of the front part. In a state where the bumper 40 is assembled in the front end of the cover 30, the outer peripheral face of the bumper 40 is continued from that of the cover 30. Therefore, by the cover 30 and the bumper 40, the periphery of the front part of the hammer case 20 is prevented from being exposed and is protected.

The waterproof cover 50 is made of plastic and formed in a container shape having four sides, a bottom and a top enclosing a volume matching an external shape of the battery pack, wherein the top is substantially open to accommodate the housing. The waterproof cover 50 is used to cover the periphery of the battery pack 15 and a gap S1 (refer to FIGS. 3 and 4) in a coupling part between the battery pack 15 and the battery holder 13. FIG. 1 illustrates a state where the waterproof cover 50 covers the periphery of the battery pack 15 and the gap S1 (refer to FIG. 3) (hereinbelow, called an "attached state").

As shown in FIG. 3, the waterproof cover 50 has a front-side cover 51 and a rear-side cover 52 and is formed so as to be separatable in a slide attachment direction X of the battery pack 15 to the battery holder 13. As illustrated in FIG. 1, in the attached state, the front-side cover 51 is positioned on the rear side in the slide attachment direction X (the right side in FIG. 1), and the rear-side cover 52 is positioned on the front side in the slide attachment direction X (the left side in FIG. 1). The covers 51 and 52 are an example of two divided covers of the present invention.

As shown in FIG. 3, the front-side cover 51 is formed in a shape that the front side in the slide attachment direction X is open, and the rear side in the slide attachment direction X is closed. In the top face of the front-side cover 51, an opening 53 which continues to the front side of the front-side cover 51 is provided in an almost U shape in the slide attachment direction X in plan view.

Further, a projection 56 is formed in each of the right and left side faces of the front-side cover 51. As shown in FIGS. 3 and 4, a projection for latching 56A which extends to the rear side in the slide attachment direction X is provided in the rear end face of each of the projections 56. An open ring member 58 which will be described later is retained by each of the projections for latching 56A.

The rear-side cover 52 is formed in a shape that the front side in the slide attachment direction X is closed and the rear side in the slide attachment direction X is open. In the top face of the rear-side cover 52, an opening 54 which continues to the rear side of the rear-side cover 52 is provided in an almost inverted U shape in the slide attachment direction X in plan view.

A swing member attachment part 57 is projected from each of the right and left side faces of the rear-side cover 52. By the swing member attachment part 57, a swing member 57A which can swing around a coupling pin P disposed on the rear side in the slide attachment direction X is pivotally supported.

In upper and lower end faces of the swing member 57A, grooves (not shown) for supporting both open ends of the open ring member 58 are provided. The open ring member 58 is formed in a rectangular shape whose long sides extend in the slide attachment direction X. The both open ends of the open ring members 58 fit in the grooves. The open ring member 58 can move so as to be apart from or close to the side face of the rear-side cover 52 around the both open ends as supporting points. Further, a through hole 59 (refer to FIG. 3) is provided in each of the right and left side faces of the rear-side cover 52. In the attached state shown in FIG. 1, when each of the screw holes 13A (refer to FIG. 3) is covered with the rear-side cover 52, the central axis of the through hole 59 coincides with that of the screw hole 13A. Open ring member 58 passes through hole H in the swing member 57A such that moving swing member 57A causes open ring member 58 to move.

In the embodiment, as will be described next, the attached state is obtained by coupling the front-side cover 51 and the rear-side cover 52. First, the periphery of the opening 54 is made to slide along the seal face 16 until the end face of the periphery of the opening 54 comes into contact with the end face on the front side in the slide attachment direction X in the seal face 16. When the end face of the periphery of the opening 54 comes into contact with the end face, the central axis of each of the through holes 59 matches that of the screw hole 13A. Consequently, a screw 60 is inserted in the through hole 59 and fastened in the screw hole 13A and, as shown in FIG. 4, the rear-side cover 52 can be screwed in the battery holder 13. In such a manner, the rear-side cover 52 can be prevented from coming off of the battery holder 13.

Figure 5:
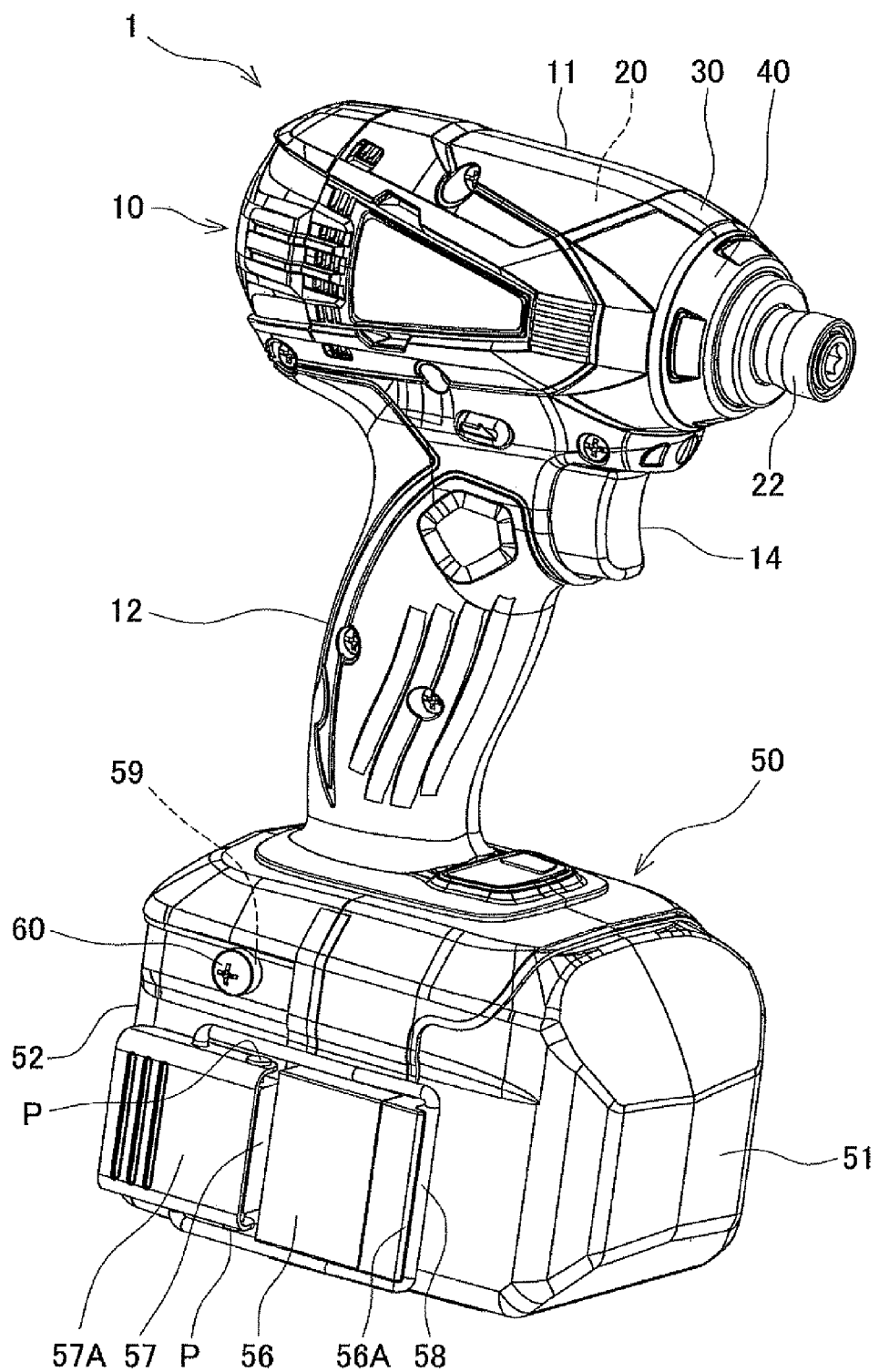
FIG. 5 is a general perspective view of the impact driver to which the waterproof cover in the first embodiment is attached.

Next, the end face of the periphery of the opening 53 is slid along the seal face 16 until it comes into contact with the end face of the opening 53 in the slide attachment direction X. Subsequently, the open ring members 58 extended from the swing members 57A are turned and retained by the projections for latching 56A (refer to FIG. 5). In the state of FIG. 5, by pulling the projections 56 toward the rear-side cover 52 side by using a close loop part of the open ring member 58, the front-side cover 51 is closely attached to the rear-side cover 52. As a result, in the attached state, the peripheries of the openings 53 and 54 are closely attached to the entire periphery of the seal face 16. Therefore, in the attached state, the openings 53 and 54 forming the opening of the waterproof cover 50 and the handle 12 can be sealed. As illustrated in FIGS. 1 and 5, the position in which the front-side cover 51 and the rear-side cover 52 are coupled is an example of the coupling position of the present invention.

On the other hand, in the case of cancelling the coupling between the front-side cover 51 and the rear-side cover 52, the swing member 57A is swung so as to be apart from the side face of the rear-side cover 52 to cancel the state where the open ring member 58 is retained by the projection for latching 56A. After that, the end face of the periphery of the opening 53 is slid so as to be separated from the seal face 16 in the slide attachment direction X along the seal face 16. As a result, the coupling state of the covers 51 and 52 can be cancelled while the rear-side cover 52 is attached to the battery holder 13 by screwing as illustrated in FIG. 4. In this state, the front-side cover 51 is separated from the rear-side cover 52 (the front side of the impact driver 1). Therefore, the battery pack 15 can be attached to/detached from the battery holder 13 by being slid. As shown in FIG. 4, the position where the coupling state of the covers 51 and 52 is cancelled is an example of a coupling cancelling position of the present invention.

As described above, the projection for latching 56A retains the open ring member 58 by swinging the swing member 57A, and the retention of the open ring member 58 from the projection for latching 56A is cancelled by swinging the swing member 57A so as to be apart from the side face of the rear-side cover 52. As a result, the covers 51 and 52 can be arbitrarily disposed in the coupling position or the coupling cancelling position. The projection 56, the projection for latching 56A, the swing member attachment part 57, the swing member 57A, and the open ring member 58 are an example of a coupling mechanism of the present invention.

Effects of First Embodiment

In the impact driver 1 of the embodiment, the open ring member 58 is retained by the projection for latching 56A in the coupling position shown in FIGS. 1 and 5, and the covers 51 and 52 can be coupled to each other in a state where the periphery of the battery pack 15 and the gap S1 are covered. Consequently, rainwater and the like can be prevented from entering the battery back 15 through the gap S1. Further, rainwater entering the battery from the outer face of the battery pack 15 can be prevented. Therefore, the waterproof performance to the battery pack 15 is improved.

Further, since the waterproof cover 50 is obtained by coupling the front-side cover 51 and the rear-side cover 52 which can be separated from each other to the opposite sides in the slide attachment direction X, the operation of rotating the waterproof cover 50 is unnecessary. Further, it is unnecessary to provide a space for turning between the inner face of the waterproof cover 50 and the battery pack 15. Therefore, even when the waterproof cover 50 is provided, the impact driver 1 can be made compact.

In the attached state shown in FIG. 1 (FIG. 5), by using the seal face 16 (refer to FIG. 3) of the battery holder 13, the openings (both of the openings 53 and 54) of the waterproof cover 50 can be closely attached to the seal face 16, and the openings and the battery holder 13 can be sealed. As a result, rainwater and the like is prevented from entering through the gap between the openings and the battery holder 13.

Further, by inserting the screws 60 in the through holes 59 and then screwing them in the screw holes 13A, the coupling state of the covers 51 and 52 can be cancelled while the rear-side cover 52 is attached to the battery holder 13 by screwing. Consequently, without detaching the rear-side cover 52 from the battery holder 13, the battery pack 15 can be attached to/detached from the battery holder 13 by being slid from the side on which the front-side cover 51 is separated from the rear-side cover 52 (the front side of the impact driver 1).

Second Embodiment

A second embodiment of the present invention will be described with reference to FIGS. 6 to 8. The same reference numeral is designated to the same configuration as that of the first embodiment and its description will not be repeated, and the same effect as that of the first embodiment will not be described. An impact driver 1A of the second embodiment has a waterproof cover 50A. The waterproof cover 50A has a front-side cover 51A and a rear-side cover 52A, and is formed so that it can be halved like the waterproof cover 50 of the first embodiment.

Figure 7:
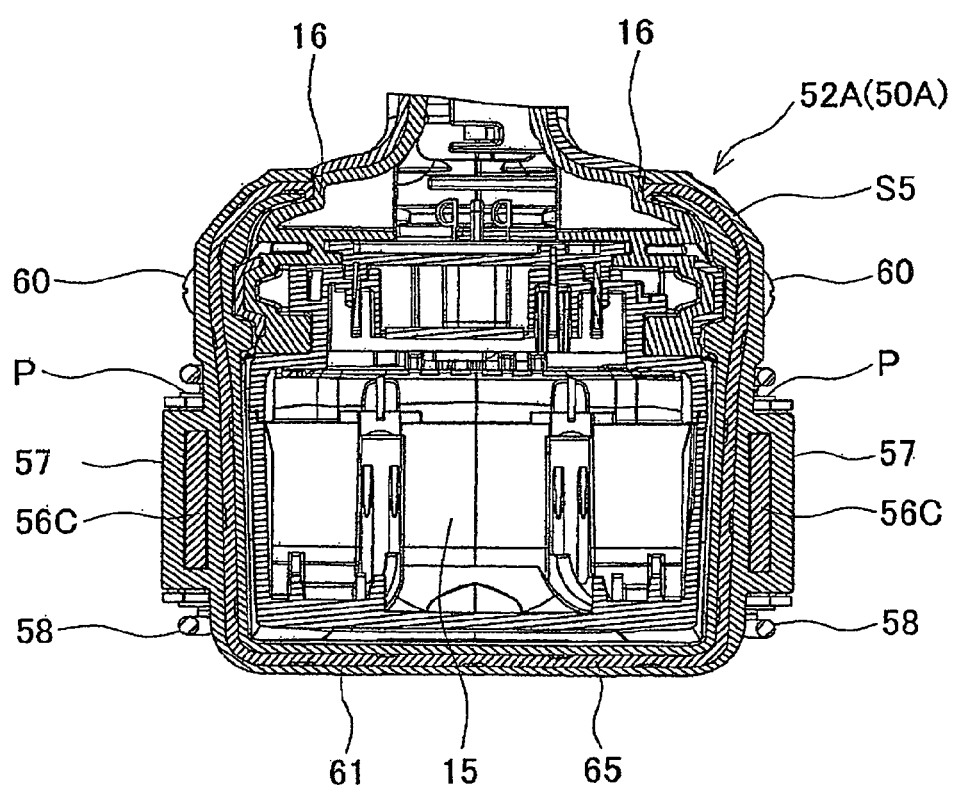
FIG. 7 is a partial enlarged vertical section of the impact driver to which a waterproof cover in the second embodiment is attached.

As shown in FIG. 7, in the rear-side cover 52A, a seal member supporting groove 61 is formed in a face S5 coupled to the front-side cover 51A. Both ends in the longitudinal direction of the seal member supporting groove 61 are open toward the seal face 16. A seal member 65 is fitted in the seal member supporting groove 61, projects from the seal member supporting groove 61, and is integrated with the coupling face S5. In addition, as shown in FIG. 8, in the front-side cover 51A, a seal member supporting groove 62 is formed in a face S6 coupled to the rear-side cover 52A. Similarly, both ends in the longitudinal direction of the seal groove 62 are open toward the seal face 16. A seal member 66 is fitted in the seal member supporting groove 62, projects from the seal member supporting groove 62, and is integrated with the coupling face S6. The seal members 65 and 66 are formed of a solid elastic material such as rubber.

The rear-side cover 52A has an opening similar to the opening 54 in the first embodiment, and the front-side cover 51A has an opening similar to the opening 53 in the first embodiment. The seal members 65 and 66 are an example of a first seal member and sealer of the present invention.

Figure 6:
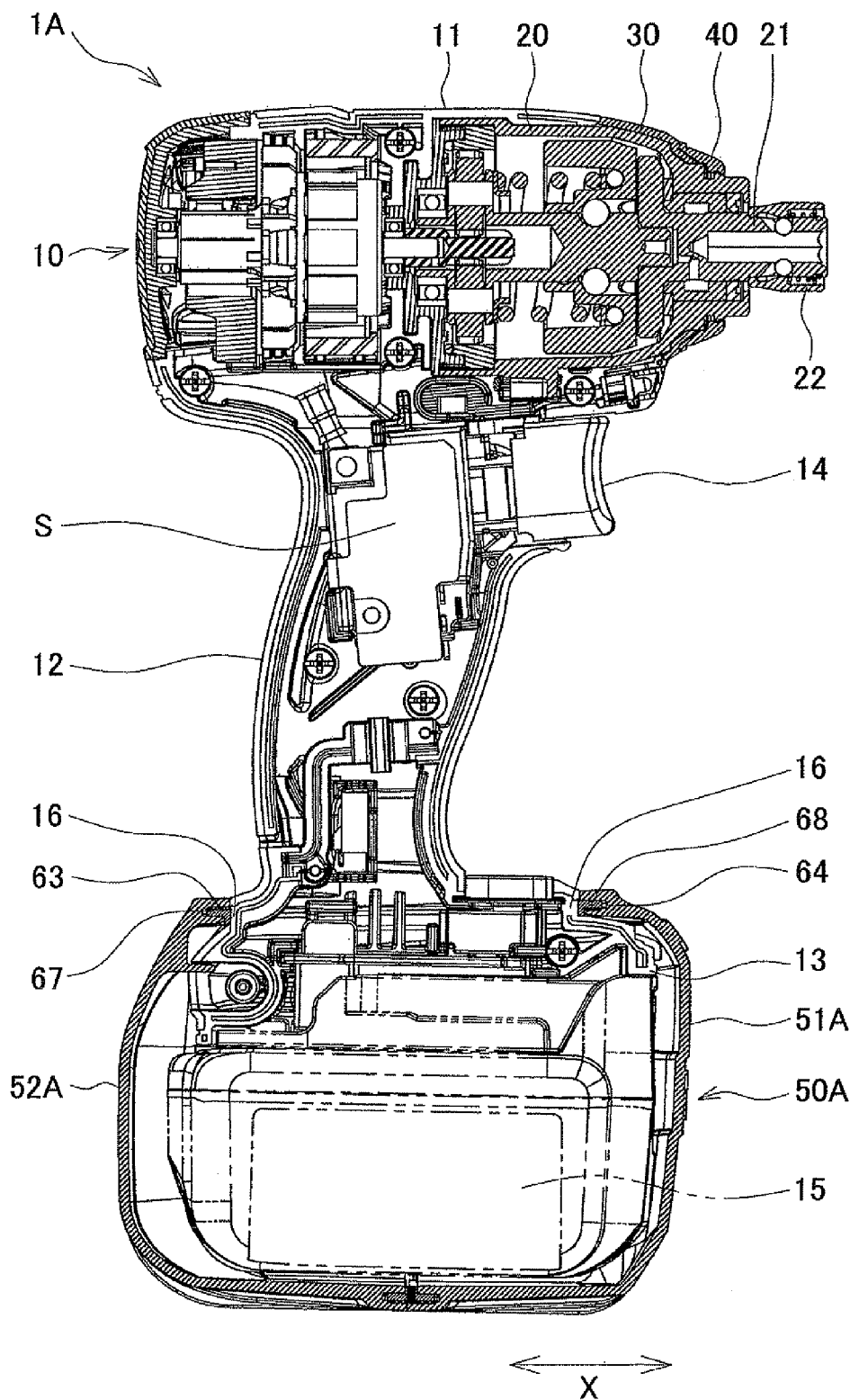
FIG. 6 is a cross section of a main part of an impact driver in a second embodiment.

Further, as shown in FIG. 6, a seal member 67 is provided integrally along the periphery of the opening of the rear-side cover 52A. The seal member 67 is fitted in a seal member supporting groove 63 formed in the periphery and projects from the seal member supporting groove 63.

A seal member 68 is provided integrally along the periphery of the opening of the front-side cover 51A, is fitted in a seal member supporting groove 64 formed in the periphery. Further, the seal member 68 projects from the seal member supporting groove 64. The seal members 67 and 68 are also formed of a solid elastic material such as rubber.

Figure 8:
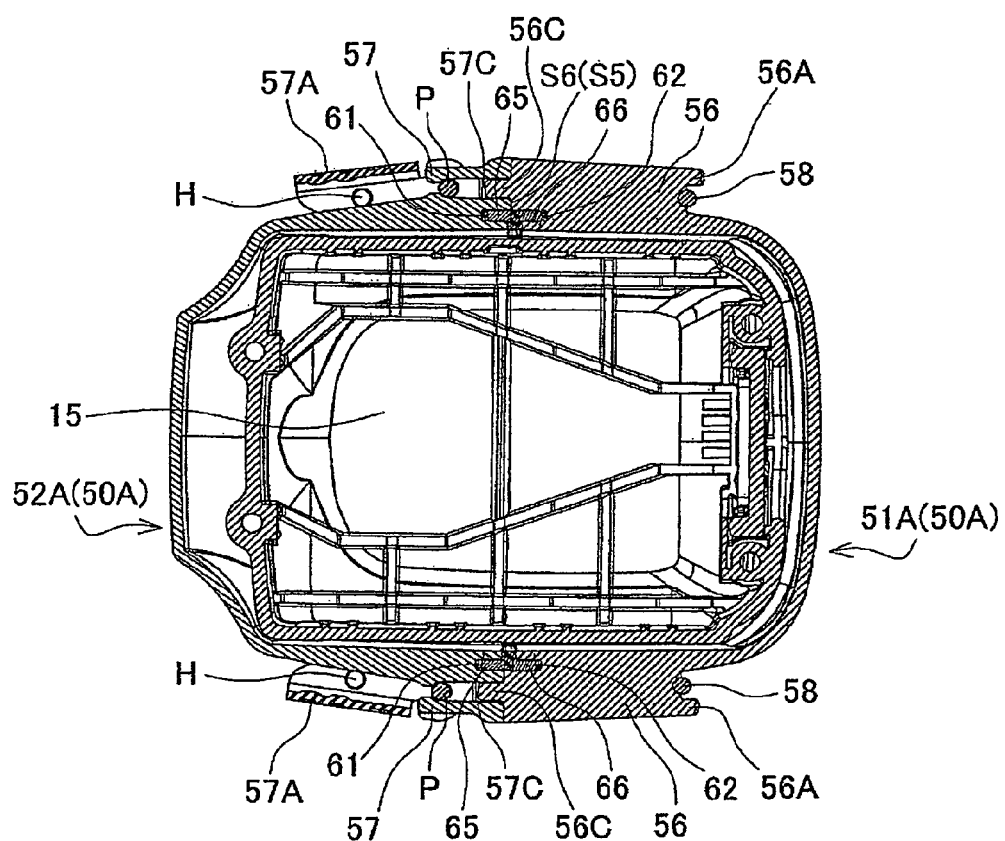
FIG. 8 is a partial enlarged transverse section of the impact driver of the second embodiment to which the waterproof cover is attached.

In the embodiment, in a manner similar to the first embodiment, when the rear-side cover 52A is attached to the battery holder 13 by screwing and the end face of the periphery of the opening of the front-side cover 51A comes into contact with the seal face 16 by being slid in the slide attachment direction X, a projection for engagement 56C (refer to FIG. 8) is inserted in a recess 57C for engagement (refer to FIG. 8). After that, the open ring member 58 is retained by the projection for latching 56A in a manner similar to the first embodiment. In the attached state, the seal members 65 and 66 are closely attached to each other and interposed between the coupling faces S5 and S6, as shown in FIG. 8. In such a manner, the coupling faces S5 and S6 can be sealed. Moreover, as shown in FIG. 6, in the attached state, the seal member 67 is elastic-deformed and is interposed between the rear-side cover 52A and the seal face 16 while being closely attached to the seal face 16. Further, the seal member 68 is elastic-deformed and is interposed between the front-side cover 51A and the seal face 16 while being closely attached to the seal face 16. Therefore, the covers 51A and 52A and the seal face 16 can be also sealed.

Effects of Second Embodiment

In the impact driver 1A of the embodiment, the coupling faces S5 and S6 are sealed by the seal member 65 provided integrally with the rear-side cover 52A and the seal member 66 provided integrally with the front-side cover 51A in the attached state. Therefore, rainwater and the like is prevented from entering the inside of the waterproof cover 50A through the gap between the coupling faces S5 and S6. Moreover, the covers 51A and 52A and the seal face 16 are sealed by the seal member 67 provided integrally with the rear-side cover 52A and the seal member 68 provided integrally with the front-side cover 51A. Therefore, rainwater and the like is prevented from entering the inside of the waterproof cover 50A through the gap between the covers 51A and 52A and the seal face 16.

Third Embodiment

A third embodiment of the present invention will be described with reference to FIGS. 9 to 11. The same reference numeral is designated to the same configuration as that of the first embodiment and its description will not be repeated, and the same effect as that of the first embodiment will not be described. An impact driver 1B of the third embodiment has a waterproof cover 50B. The waterproof cover 50B is also formed by a front-side cover 51B and a rear-side cover 52B so that it can be halved.

Figure 10:
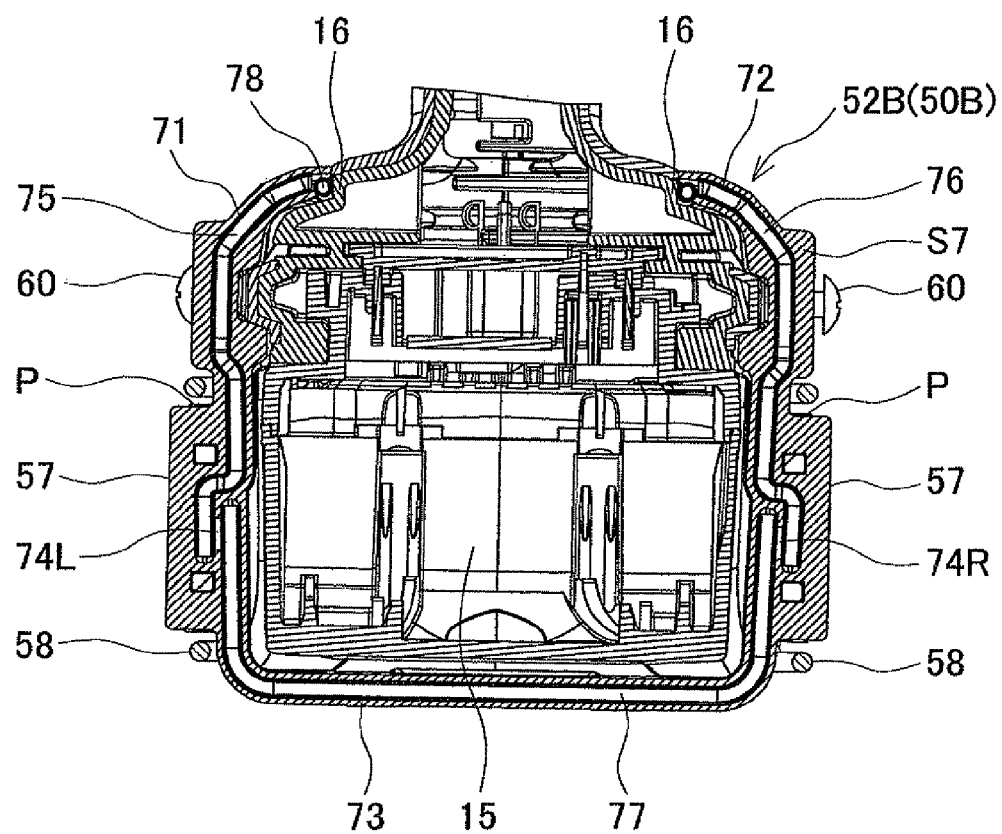
FIG. 10 is a partial enlarged vertical section of the impact driver to which the waterproof cover in the third embodiment is attached.
Figure 11:
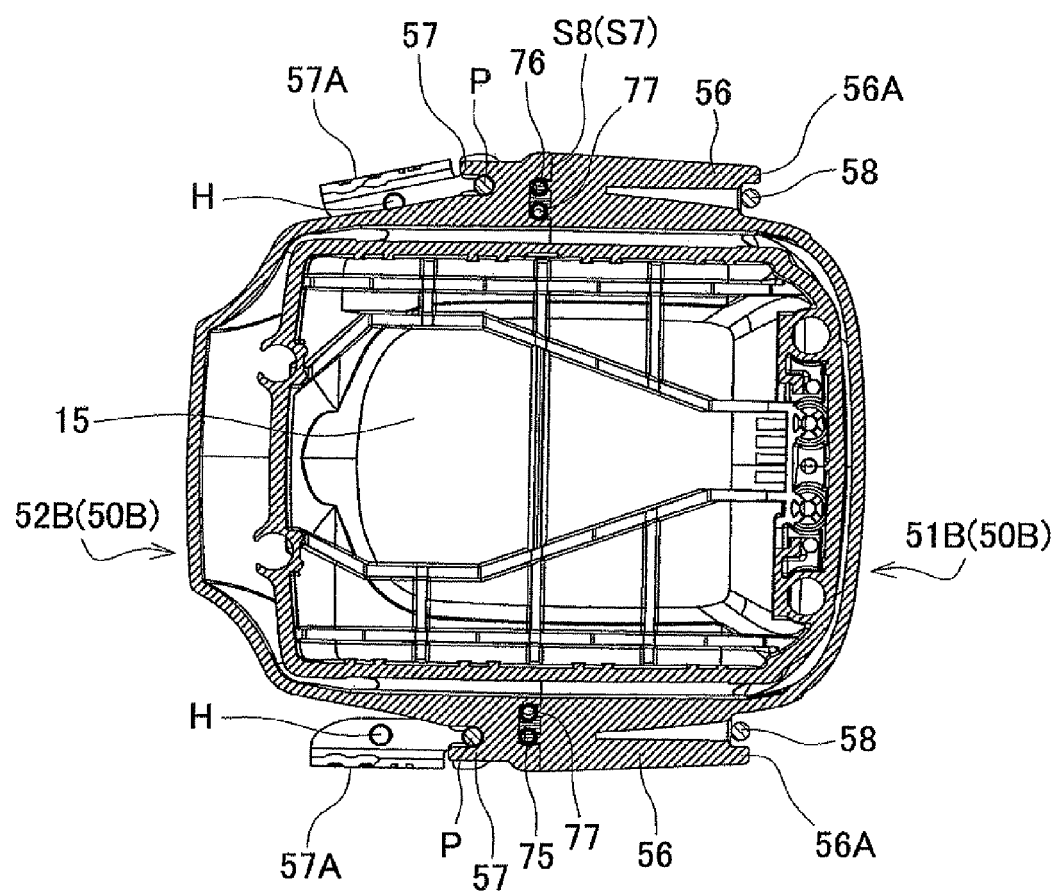
FIG. 11 is a partial enlarged transverse section of the impact driver of the third embodiment to which the waterproof cover is attached.

As shown in FIG. 10, in the rear-side cover 52B, three seal member supporting grooves 71 to 73 are formed in a face S7 to be coupled to the front-side cover 51B. The seal member supporting groove 71 is formed in the upper half on the left side of the coupling face S7 in front view of the rear-side cover 52B. The upper end of the seal member supporting groove 71 is open toward the seal face 16, and the lower end of the seal member supporting groove 71 has a bottom and is closed. On the other hand, the seal member supporting groove 72 is formed along the upper half on the right side of the coupling face S7 in front view of the rear-side cover 52B, and the upper end of the seal member supporting groove 72 is open toward the seal face 16, and the bottom end of the seal member supporting groove 72 has a bottom and is closed. The seal member supporting groove 73 is formed in the lower half of the coupling face S7 in a state where the seal member supporting grooves 71 and 72 are discontinuous. Both of the end faces of the seal member supporting groove 73 are closed. The outside of the periphery of one end of the seal member supporting groove 73 is communicated with the inside of the periphery of the lower end of the seal member supporting groove 71 via a communication groove 74L provided in the lateral direction of the coupling face S7 (the lateral direction in FIG. 10). The outside of the periphery of the other end of the seal member supporting groove 73 is communicated with the inside of the periphery of the lower end of the seal member supporting groove 72 via a communication groove 74R provided in the above-described lateral direction.

A seal member 75 is fitted in the seal member supporting groove 71 and is integrated with the coupling face S7. A seal member 76 is fitted in the seal member supporting groove 72 and is integrated with the coupling face S7. A seal member 77 is fitted in the seal member supporting groove 73 and is integrated with the coupling face S7. Each of the seal members 75 to 77 is made of a solid elastic material such as rubber. Each of the seal members 75 to 77 is an example of a first seal member and sealer of the present invention.

Figure 9:
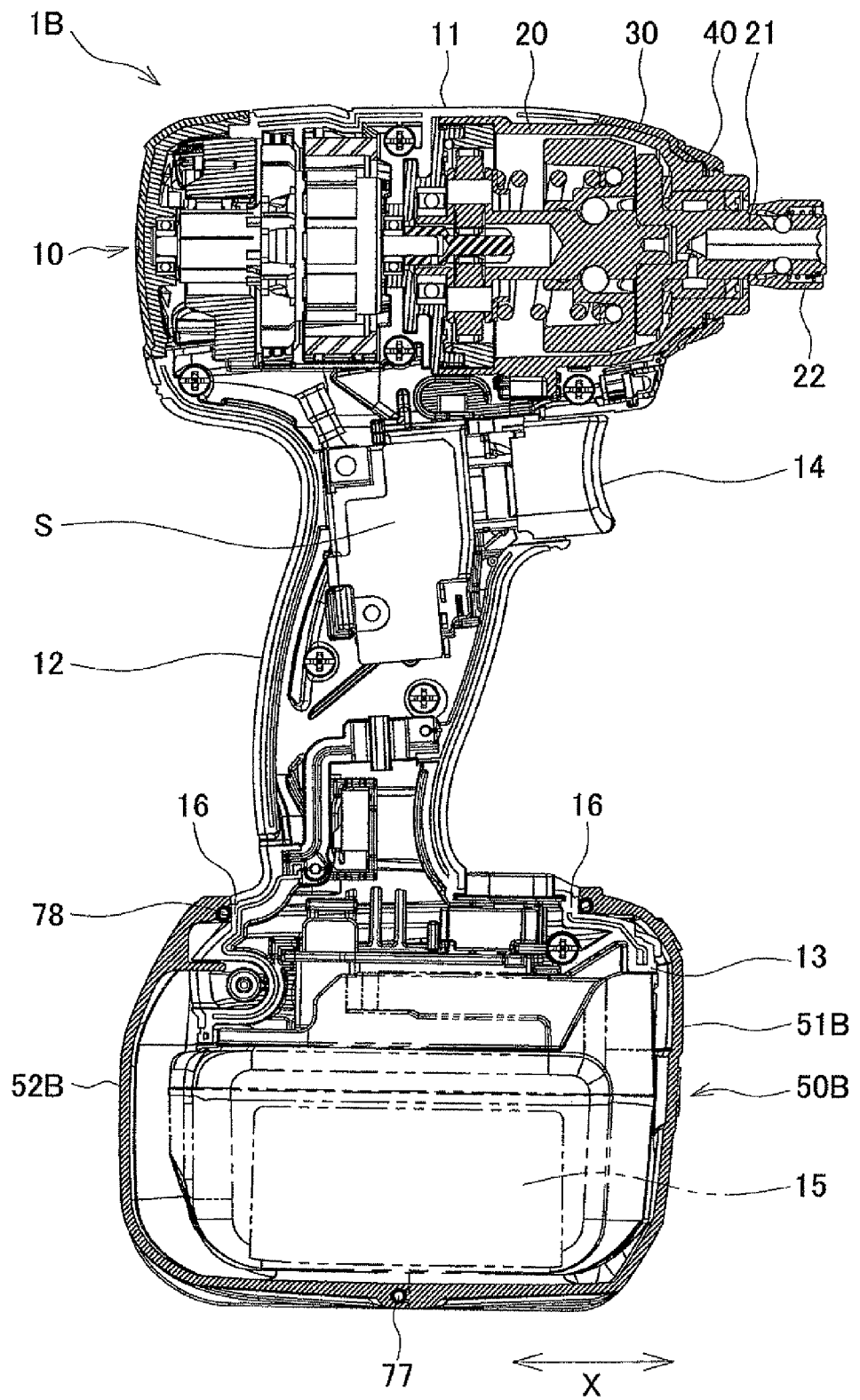
FIG. 9 is a cross section of a main part of an impact driver in a third embodiment.

As shown in FIGS. 9 and 10, an annular seal member 78 is attached to the seal face 16 so as to surround the seal face 16. The seal member 78 is formed of a solid elastic material such as rubber. The seal member 78 is an example of a second seal member having an annular shape of the present invention.

In the third embodiment, in a manner similar to the first embodiment, in the attached state where the open ring member 58 is retained by the projection for latching 56A, as shown in FIG. 10, the seal member 78 is interposed between the covers 51B and 52B and the seal face 16, and the front end faces on the upper side of both of the seal members 75 and 76 are closely attached to the seal member 78. As a result, the covers 51B and 52B and the seal face 16 can be sealed, and the seal member 78 and the front end faces on the upper side of the seal members 71 and 72 can be also sealed. Further, as illustrated in FIG. 11, in the attached state, the peripheral face of each of the seal members 75 to 77 is closely attached to a face S8 to be coupled to the rear-side cover 52 in the front-side cover 51B, and the seal members 75 to 77 are interposed between the coupling faces S8 and S7. Further, the lower end of the seal member 75 and one end of the seal member 77 are elastic-deformed and enter the communication groove 74L. Therefore, the lower end of the seal member 75 and the one end of the seal member 77 are closely attached to form a waterproof seal with each other. In addition, the lower end of the seal member 76 and the other end of the seal member 77 are elastic-deformed and enter the communication groove 74R. Therefore, the lower end of the seal member 76 and the other end of the seal member 77 are closely attached to each other. Therefore, the coupling faces S8 and S7 can be also sealed.

Effects of Third Embodiment

In the impact driver 1B of the embodiment, the covers 51B and 52B and the seal face 16 are sealed by the seal member 78 in the attached state. Therefore, rainwater and the like is prevented from entering the inside of the waterproof cover 50B through the gap between the covers 51B and 52B and the seal face 16. Further, the coupling faces S8 and S7 are sealed by the seal members 75 to 77 provided integrally with the rear-side cover 52B. Therefore, rainwater and the like is prevented from entering the inside of the waterproof cover 50B through the gap between the coupling faces S8 and S7.

The present invention is not limited to the foregoing embodiments but can be applied by properly changing a part of the configuration without departing from the gist of the invention. For example, different from the foregoing embodiments, by making the front-side cover and the rear-side cover come into contact with each other and winding a fastening member such as a belt around the entire periphery of the side faces of both of the covers, the front-side cover and the rear-side cover may be also closely attached and coupled to each other.

Different from the second embodiment, a seal member may be provided integrally with either the coupling face S5 or the coupling face S6 and interposed between the coupling faces S5 and S6 in the attached state. Further, different from the third embodiment, all of the seal members 75 to 77 may be formed of a solid elastic material. In addition, although the infiltration of rainwater and the like to the inside of the waterproof cover 50B is prevented by using the seal members 75 to 77 which are fitted in the three seal member supporting grooves 71 to 73 provided in the coupling face S7 in the third embodiment. Instead, infiltration of rainwater and the like to the inside of the waterproof cover 50B may be prevented by using one seal member supporting groove formed along either the coupling face S7 or the coupling face S8 and one seal member which is fitted in the groove.

The present invention is not limited to the impact drivers 1, 1A, and 1B but may be applied to electric tools such as a rechargeable hammer drill and a rechargeable grinder.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims.

What is claimed is:

1. A rechargeable electric tool comprising:
a battery holder provided at an end of a housing;
a battery pack which is slide-attached in the battery holder and serves as a power supply;
a waterproof cover in a container shape having four sides, a bottom and a top enclosing a volume matching an external shape of the battery pack,
wherein the top is substantially open to accommodate the housing,
which covers the battery pack including a coupling part for coupling the battery holder and the battery pack, and formed by a first divided cover and a second divided cover which are separated to front and rear sides such that the first divided cover and the second divided cover separate from the tool along an axis parallel to a slide attachment direction of the battery pack; and
a coupling mechanism which is provided between the first divided cover and the second divided cover and can be arbitrarily operated between a coupling position in which the first divided cover is coupled to the second divided cover in an attached state where the coupling part and the battery pack are covered with the first divided cover and the second divided cover and a coupling cancelling position in which coupling of the first divided cover and the second divided cover is cancelled.

2. The rechargeable electric tool according to claim 1, wherein a sealer which seals coupling faces of the first divided cover and the second divided cover in the attached state is provided between the first divided cover and the second divided cover.

3. The rechargeable electric tool according to claim 2, wherein the sealer is a first seal member provided integrally with a coupling face of at least one of the first divided cover or the second divided cover, the first divided cover is to be coupled to the second divided cover, and the first seal member is interposed between the coupling faces of the first divided cover and the second divided cover in the attached state.

4. The rechargeable electric tool according to claim 3, wherein a seal face is provided in the battery holder and seals a gap between the housing and the waterproof cover, with which an entire periphery of an opening of the waterproof cover comes into contact in the attached state.

5. The rechargeable electric tool according to claim 4, wherein an annular second seal member is interposed between the waterproof cover and the seal face in the attached state.

6. The rechargeable electric tool according to claim 3, wherein the first seal member is provided integrally with the coupling face of the first divided cover, which is to be coupled to the second divided cover and the coupling face of the second divided cover, which is to be coupled to the first divided cover,
- a first seal member supporting groove which is formed in the coupling face and fitted with the first seal member in a state where the first seal member extends from the coupling face in the first divided cover is to be coupled to the second divided cover, and
- a second seal member supporting groove which is formed in the coupling face and fitted with the first seal member in a state where the first seal member extends from the coupling face in the second divided cover is to be coupled to the first divided cover.

7. The rechargeable electric tool according to claim 4, wherein the seal face is formed in an entire periphery of the battery holder and has a stepped face which protrudes from an outer surface of the battery holder, and the periphery of the opening of the waterproof cover comes into contact with the stepped face.

8. The rechargeable electric tool according to claim 5, wherein the first seal member and the second annular seal members are formed of a solid elastic material.

9. The rechargeable electric tool according to claim 5, wherein the second annular seal member is attached to the seal face so as to surround the seal face.

10. The rechargeable electric tool according to claim 9, wherein the first seal member and second annular seal member are formed of a solid elastic material.

11. The rechargeable electric tool according to claim 1, wherein the battery holder has a screw hole for attaching a hook for hanging, and the divided cover has a through hole which can cover the screw hole when the divided cover is slid in the slide attachment direction to a position where the through hole is overlapped with the screw hole.

12. The rechargeable electric tool according to claim 1, wherein the coupling mechanism includes:
- a plurality of projections for latching provided so as to project from right and left side faces of one of the divided covers;
- a plurality of swing members swinging to be apart from or close to the side faces are provided so as to project from right and left side faces of the other divided cover; and
- a plurality of annular ring members which are supported by the plurality of swing members and can be retained by the projections for latching in a state where the plurality of projections for latching are pulled to the other divided cover in the coupling position.

13. The rechargeable electric tool according to claim 1, wherein the divided covers are formed of plastic.

* * * * *